(12) United States Patent
Ohtaki et al.

(10) Patent No.: US 7,227,447 B2
(45) Date of Patent: Jun. 5, 2007

(54) SWITCH DEVICE

(75) Inventors: Kiyokazu Ohtaki, Niwa-gun (JP);
Takayuki Hiramitsu, Niwa-gun (JP);
Daisuke Kawamura, Niwa-gun (JP);
Tomoyuki Funayama, Toyota (JP);
Koji Iwamoto, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 324 days.

(21) Appl. No.: 10/823,160

(22) Filed: Apr. 13, 2004

(65) Prior Publication Data

US 2004/0207516 A1 Oct. 21, 2004

(30) Foreign Application Priority Data

Apr. 16, 2003 (JP) ............................. 2003-111941

(51) Int. Cl.
*G06K 19/00* (2006.01)
*B60R 25/00* (2006.01)
*B60R 25/04* (2006.01)

(52) U.S. Cl. .................. 340/5.62; 340/5.72; 307/10.2; 307/10.3; 307/10.4; 307/10.5

(58) Field of Classification Search .............. 340/5.62; 307/10.4
See application file for complete search history.

(56) References Cited

U.S. PATENT DOCUMENTS

| | | | | |
|---|---|---|---|---|
| 4,148,967 A * | 4/1979 | Satoh et al. | ................ | 428/416 |
| 5,461,386 A | 10/1995 | Knebelkamp | ................ | 342/44 |
| 5,823,028 A | 10/1998 | Mizuno et al. | ............... | 70/278 |
| 5,836,187 A | 11/1998 | Janssen et al. | ................. | 70/252 |
| 6,181,025 B1 | 1/2001 | McConnell et al. | ........ | 307/10.2 |
| 6,259,168 B1 * | 7/2001 | Okada | ........................ | 307/10.5 |
| 6,351,206 B1 * | 2/2002 | Schweiger et al. | ........ | 340/5.64 |
| 6,400,254 B2 * | 6/2002 | Yamamoto et al. | .......... | 340/5.6 |
| 6,992,952 B2 * | 1/2006 | Endo et al. | ..................... | 368/10 |
| 2003/0231100 A1 * | 12/2003 | Chung | ........................ | 307/10.5 |

FOREIGN PATENT DOCUMENTS

| | | |
|---|---|---|
| DE | 195 20211 | 2/1996 |
| EP | 0 730 073 | 9/1996 |
| EP | 0 967 129 | 12/1999 |
| GB | 2 204 353 A | 11/1988 |
| JP | 2002-188505 | 7/2002 |

OTHER PUBLICATIONS

Partial European Search Report, issued on Aug. 12, 2004, in corresponding EPO Application No. EP 04 25 2089.
European Search Report, dated Jan. 25, 2005, issued in corresponding EPO Application No. EP 04 25 2089.0.

* cited by examiner

*Primary Examiner*—Wendy R. Garber
*Assistant Examiner*—Clara Yang
(74) *Attorney, Agent, or Firm*—Synnestvedt & Lechner LLP

(57) ABSTRACT

A switch device is provided that ensures formation of a communicable area by a coil antenna. The switch device includes an ignition switch operated by an operator for driving an engine starter, a decorative cap arranged to surround the ignition switch and having an ornamental surface, and the coil antenna arranged adjacent to the decorative cap for transmitting a transponder-driving radio wave. The decorative cap includes a transmittable area that can transmit the transponder-driving radio wave therethrough. The transmittable area is formed in a part of the decorative cap excluding the ornamental surface.

22 Claims, 6 Drawing Sheets ents mounted in a vehicle. To
SWITCH DEVICE

BACKGROUND OF THE INVENTION

The present invention relates to a switch device, and in particular, to a switch device operated for driving a device.

To prevent vehicles from being stolen, portable devices, which transmit an ID code signal including an ID code, have recently been used instead of conventional mechanical keys. Such a portable device is held by a user (owner) of a vehicle. A "smart ignition" function has been proposed, which enables the engine of a vehicle to start based on an ID code signal wirelessly transmitted from the portable device. As one example, Japanese Laid-Open Patent Publication No. 2002-188505 discloses an engine controller for vehicles with the smart ignition function.

Normally, the portable device, held, for example, in a pocket of the user's clothing, mutually communicates with the vehicle by automatically transmitting an ID code signal to the vehicle. The engine of the vehicle is enabled to start by operating an ignition switch, when an ID code included in the ID code signal transmitted from the portable device matches an ID code preset for the vehicle. When, for example, a battery of the portable device is drained, the portable device does not automatically transmit an ID code signal. In this case, the user places the portable device in a communicable area where the portable device can receive a transponder-driving radio wave transmitted from the vehicle. A transponder built into the portable device receives a transponder-driving radio wave from the vehicle to generate electric power, and transmits a transponder signal using the electric power. In this way, the portable device mutually communicates with the vehicle, using a transponder signal transmitted from its transponder. When a transponder code included in the transponder signal transmitted from the portable device matches a transponder code preset for the vehicle, the engine of the vehicle is enabled to start by operating the ignition switch.

To realize this, a coil antenna for outputting a transponder-driving radio wave and the ignition switch are installed in the vicinity of the driver's seat in the vehicle. In recent years, however, vehicle systems have been rapidly computerized and have become provided with more functions. This has increased the number of electric and electronic components used in vehicles. This has created a demand for reducing the space occupied by each component mounted in a vehicle. To meet the demand, a switch device, in which a coil antenna and an ignition switch with a push button are integrally arranged, has been proposed.

In such a switch device, a decorative member whose surface is furnished with decorative plating is provided to surround the outer rim of the push button. This improves the appearance quality of the passenger compartment. Further, the push button stands out.

When, however, the coil antenna is arranged close to the decorative member, a transponder-driving radio wave output from the coil antenna is easily blocked by the decorative plating on the surface of the decorative member. This makes it difficult to form a communicable area where the vehicle is communicable with the portable device using a transponder-driving radio wave. Thus, the coil antenna fails to fully exhibit its communication function.

SUMMARY OF THE INVENTION

The present invention provides a more compact decorated switch device that ensures formation of the communicable area.

The present invention provides a switch device for use by an operator and connection to an actuator, for enabling the actuator to be driven when an ID code transmitted from a transponder of a portable device matches a predetermined ID code of a vehicle controller. The switch device includes an operation switch operated by the operator for driving the actuator. A decorative member is arranged to surround the operation switch. The decorative member has an ornamental surface. A communication means is arranged adjacent to the decorative member for transmitting a transponder-driving radio wave that causes the transponder to generate electromotive force used to transmit the ID code. The decorative member includes a transmittable area for transmitting the transponder-driving radio wave. The transmittable area is formed in a part of the decorative member excluding the ornamental surface.

A further aspect of the present invention is a switch device for use by an operator and connection to an actuator, for enabling the actuator to be driven when an ID code transmitted from a transponder of a portable device matches a predetermined ID code of a vehicle controller. The switch device includes an operation switch operated by the operator for driving the actuator. The operation switch includes an operation button and a case. A coil antenna is wound around the case for transmitting a transponder-driving radio wave that causes the transponder to generate electromotive force used to transmit the ID code. A decorative member is attached to the case to surround the operation button and the coil antenna. The decorative member has an ornamental surface that is furnished with decorative plating and is exposed. The decorative member includes a transmittable area for transmitting the transponder-driving radio wave. The transmittable area is formed in a part of the decorative member that excludes the ornamental surface and that corresponds to an outer side and an inner side of the coil antenna.

A further aspect of the present invention is a switch device for use by an operator and connection to an actuator, for enabling the actuator to be driven when an ID code transmitted from a transponder of a portable device matches a predetermined ID code of a vehicle controller. The switch device includes an operation switch operated by the operator for driving the actuator. A decorative member is arranged to surround the operation switch. A communication means is arranged adjacent to the decorative member for transmitting a transponder-driving radio wave that causes the transponder to generate electromotive force used to transmit the ID code. A ferromagnetic body is arranged between the communication means and the decorative member, for amplifying the transponder-driving radio wave.

A further aspect of the present invention is a switch device for use by an operator and connection to an actuator, for enabling the actuator to be driven when an ID code transmitted from a transponder of a portable device matches a predetermined ID code of a vehicle controller. The switch device includes an operation switch operated by the operator for driving the actuator. A decorative member is arranged to surround the operation switch. A communication means is spaced from the decorative member for transmitting a transponder-driving radio wave that causes the transponder to generate electromotive force used to transmit the ID code.

The communication means includes a ferromagnetic core, for amplifying the transponder-driving radio wave. A coil is wound around the core.

A further aspect of the present invention is a switch device for use by an operator and connection to an actuator, for enabling the actuator to be driven when an ID code transmitted from a transponder of a portable device matches a predetermined ID code of a vehicle controller. The switch device includes an operation switch operated by the operator for driving the actuator. A decorative member is arranged to surround the operation switch. A communication means is arranged adjacent to the decorative member for transmitting a transponder-driving radio wave that causes the transponder to generate electromotive force used to transmit the ID code. The decorative member is separable from the communication means to ensure formation of a magnetic path for the transponder-driving radio wave near the operation switch.

A further aspect of the present invention is a switch device for use by an operator and connection to an actuator, for enabling the actuator to be driven when an ID code transmitted from a transponder of a portable device matches a predetermined ID code of a vehicle controller. The switch device includes an operation switch operated by the operator for driving the actuator. The operation switch includes an operation button and a case. A coil antenna is wound around the case for transmitting a transponder-driving radio wave that causes the transponder to generate electromotive force used to transmit the ID code. A decorative member is removably attached to the case to surround the operation button and the coil antenna. A detection switch detects that the decorative member has been removed from the case. The coil antenna transmits the transponder-driving radio wave based on the removal of the decorative member detected by the detection switch.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
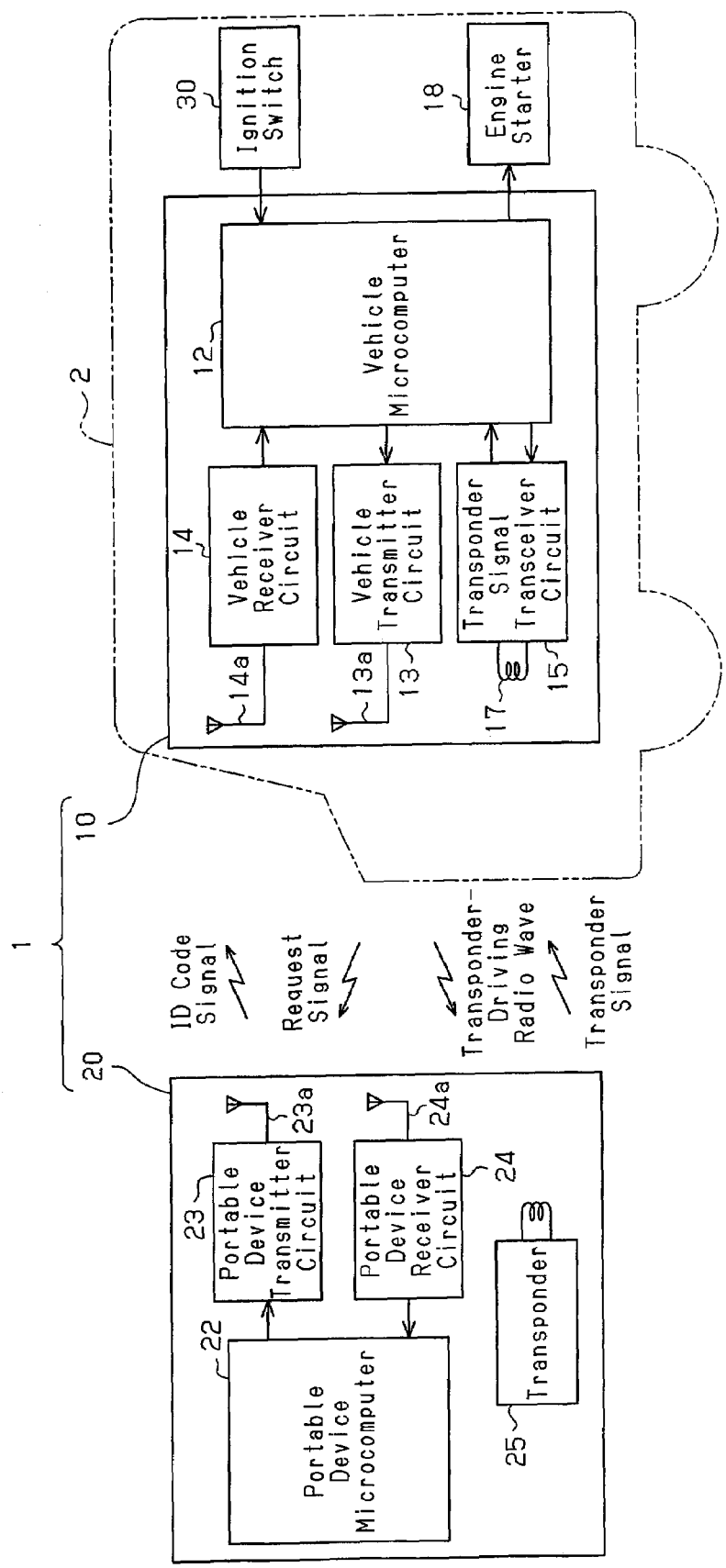
FIG. 1 is a schematic block diagram of an engine start/stop control system according to the first to third embodiments of the present invention.

In the drawings, like numerals are used for like elements throughout.

First Embodiment

Figure 2:
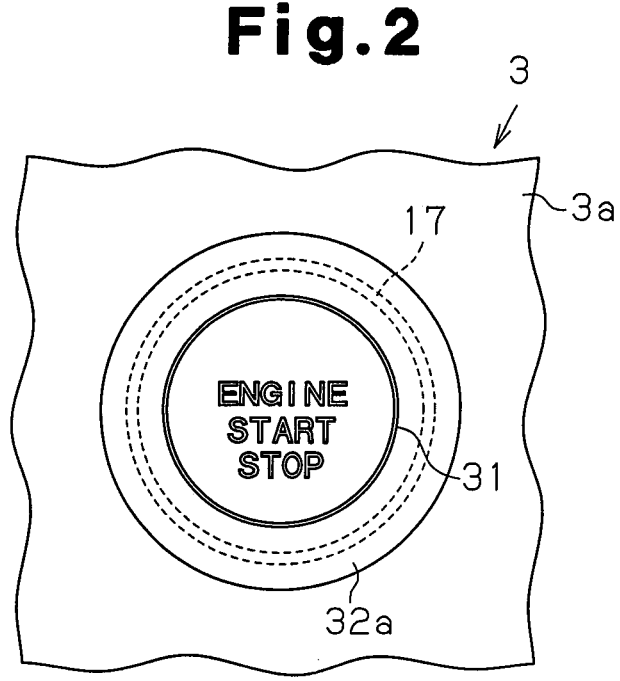
FIG. 2 is an enlarged plan view of an ignition switch according to the first to fourth embodiments of the present invention.
Figure 3:
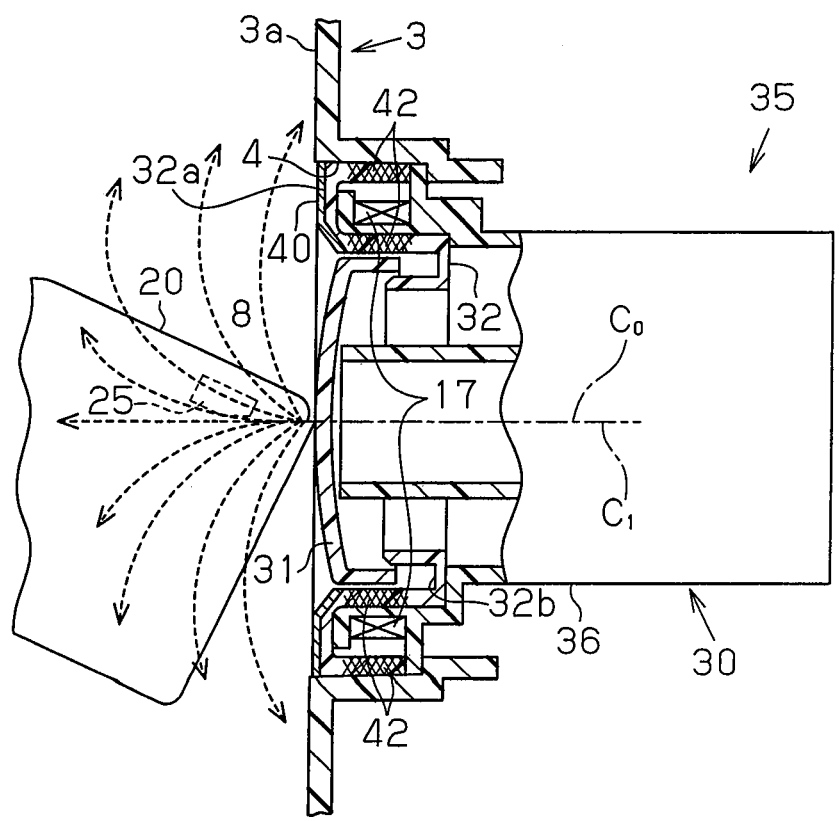
FIG. 3 is a partial cross-sectional view of a switch device according to the first embodiment of the present invention.

The following describes a switch device 35 according to a first embodiment of the present invention with reference to FIGS. 1 to 3.

As shown in FIG. 1, an engine start/stop control system 1 includes a vehicle controller 10 that is mounted on a vehicle 2, and a portable device 20 that is separate from the vehicle 2. The portable device 20 is held by a user (owner) of the vehicle 2. The vehicle controller 10 transmits a request signal and a transponder-driving radio wave. The portable device 20 transmits an ID code signal and a transponder signal.

The vehicle controller 10 includes a vehicle microcomputer 12, a vehicle transmitter circuit 13, a vehicle receiver circuit 14, and a transponder signal transceiver circuit 15. Each of the vehicle transmitter circuit 13, the vehicle receiver circuit 14, and the transponder signal transceiver circuit 15 is connected to the vehicle microcomputer 12. A transmitter antenna 13a is connected to the vehicle transmitter circuit 13. A coil antenna 17, which functions as a communication means, is connected to the transponder signal transceiver circuit 15. A receiver antenna 14a, which receives an ID code signal from the portable device 20, is connected to the vehicle receiver circuit 14.

The vehicle microcomputer 12 provides the portable device 20 with a request signal by using the vehicle transmitter circuit 13. The vehicle microcomputer 12 has a memory (not shown) storing an ID code unique to the owner's vehicle 2 (ID code that differs depending on each vehicle).

The vehicle microcomputer 12 intermittently provides the vehicle transmitter circuit 13 with a request signal. The vehicle transmitter circuit 13 converts the electric request signal transmitted from the vehicle microcomputer 12 into a radio wave with a predetermined frequency and transmits the radio wave to the vehicle 2 via the transmitter antenna 13a. Also, the vehicle microcomputer 12 provides the transponder signal transceiver circuit 15 with a transponder-driving signal. The transponder signal transceiver circuit 15 converts the electric transponder-driving signal transmitted from the vehicle microcomputer 12 into a radio wave with a predetermined frequency to generate a transponder-driving radio wave. The transponder signal transceiver circuit 15 transmits the transponder-driving radio wave to a predetermined area in the passenger compartment via the coil antenna 17.

The vehicle receiver circuit 14 receives an ID code signal from the portable device 20 via the receiver antenna 14a. The vehicle receiver circuit 14 demodulates the ID code signal received from the portable device 20 to a pulse signal to generate a receiver signal. The vehicle receiver circuit 14 transmits the receiver signal to the vehicle microcomputer 12. The transponder signal transceiver circuit 15 receives a transponder signal from the portable device 20 via the coil antenna 17. The transponder signal transceiver circuit 15 demodulates the transponder signal received from the portable device 20 to a pulse signal to generate a receiver signal and provides the vehicle microcomputer 12 with the receiver signal.

An ignition switch 30 (operation switch) installed in the passenger compartment is electrically connected to an input terminal of the vehicle microcomputer 12. An engine starter 18 (actuator) is electrically connected to an output terminal of the vehicle microcomputer 12. The engine starter 18 automatically starts the engine (actuated device) upon receipt of a start signal from the vehicle microcomputer 12.

The vehicle microcomputer 12 compares an ID code prestored in its memory with an ID code included in an ID code signal received from the portable device 20 to determine whether the two ID codes match. When determining that the two ID codes match, the vehicle microcomputer 12 provides the engine starter 18 with a start signal or a stop signal in response to an ON signal or an OFF signal provided from the ignition switch 30. In this way, the vehicle microcomputer 12 validates the operation of the ignition switch 30. Here, "validation of the operation of the ignition switch 30" is intended to mean enabling in the vehicle 2 the starting of the engine if stopped, or enabling the stopping of the engine if running when a push button 31 of the ignition switch 30 is pressed.

When determining that the two ID codes do not match, the vehicle microcomputer 12 does not provide the engine starter 18 with a start signal or a stop signal even upon receipt of an ON signal or an OFF signal from the ignition switch 30. In this way, the vehicle microcomputer 12 invalidates the operation of the ignition switch 30. Here, "invalidation of the operation of the ignition switch 30" is intended to mean disabling the starting of the engine if stopped or disabling the stopping of the engine if running in the vehicle 2 even when the push button 31 of the ignition switch 30 is pressed.

The vehicle microcomputer 12 compares a transponder ID code prestored in its memory (hereafter simply referred to as a "transponder code"), with a transponder code included in a transponder signal transmitted from the transponder 25 to determine whether the two transponder codes match. When determining that the two transponder codes match, the vehicle microcomputer 12 provides the engine starter 18 with a start signal in response to an ON signal provided from the ignition switch 30. Alternatively, the vehicle microcomputer 12 provides the engine starter 18 with a stop signal in response to an OFF signal provided from the ignition switch 30. In this way, the vehicle microcomputer 12 validates the operation of the ignition switch 30.

When determining that the two transponder codes do not match, the vehicle microcomputer 12 does not provide the engine starter 18 with a start signal or a stop signal even upon receipt of an ON signal or an OFF signal from the ignition switch 30. In this way, the vehicle microcomputer 12 invalidates the operation of the ignition switch 30.

The portable device 20 includes a portable device microcomputer 22. The portable device microcomputer 22 receives a request signal transmitted from the vehicle microcomputer 12 and determines whether the received request signal has been issued by the owner's vehicle 2. Only when determining that the request signal has been issued by the owner's vehicle 2, the portable device microcomputer 22 provides the vehicle controller 10 with an ID code signal by using a portable device transmitter circuit 23. The ID code signal includes a unique ID code that enables the owner's vehicle 2 to be distinguished from other vehicles. The ID code is stored in a memory of the portable device microcomputer 22.

The portable device 20 includes the portable device transmitter circuit 23 and a portable device receiver circuit 24, each of which is connected to the portable device microcomputer 22. A transmitter antenna 23a is connected to the portable device transmitter circuit 23 for transmitting an ID code signal. A receiver antenna 24a is connected to the portable device receiver circuit 24 for receiving a request signal from the vehicle 2. The portable device microcomputer 22 provides the portable device transmitter circuit 23 with an ID code signal. The portable device transmitter circuit 23 converts the electric ID code signal transmitted from the portable device microcomputer 22 into a radio wave with a predetermined frequency, and transmits the radio wave via the transmitter antenna 23a. The portable device receiver circuit 24 demodulates the request signal transmitted from the vehicle 2 to a pulse signal to generate a receiver signal and provides the portable device microcomputer 22 with the receiver signal.

The portable device 20 includes a transponder 25. The transponder 25 is used in an emergency when a battery, which functions as a power source for the portable device microcomputer 22 is drained. The transponder 25 transmits a transponder signal to the vehicle controller 10. The transponder signal includes a unique transponder code that enables the owner's vehicle 2 to be distinguished from other vehicles. The vehicle controller 10 generates a transponder-driving radio wave, which is an electromagnetic field. When the transponder 25 is located in an area where the electromagnetic field is being generated, a coil included in the transponder 25 generates electromotive force. In this state, the transponder 25 uses the electromotive force of the coil to transmit a transponder signal including a transponder code.

As shown in FIG. 3, a receptacle 4 is formed in an instrument panel 3. The switch device 35 is inserted in the receptacle 4. The switch device 35 includes the ignition switch 30 (operation switch). The ignition switch 30 includes a push button 31 and a case 36. The ignition switch 30 is alternately switched on and off by pressing the push button 31. As shown in FIGS. 2 and 3, the push button 31 of the ignition switch 30 is arranged in a decorative surface 3a of the instrument panel 3.

The coil antenna 17 (communication means) is wound around an end part (end part close to the push button 31) of the case 36 of the ignition switch 30. The coil antenna 17 outputs a transponder-driving radio wave, which causes the transponder 25 built in the portable device 20 to generate electromotive force. In the first embodiment, the coil antenna 17 and the ignition switch 30 are arranged so that an axis C1 of the coil antenna 17 and an axis C0 of the ignition switch 30 substantially coincide with each other. This arrangement enables a transponder-driving-radio wave output from the coil antenna 17 to form a magnetic field centered on the axis C0 of the ignition switch 30 as indicated by broken lines in FIG. 3. A communicable area 8 spatially extends outside the ignition switch 30.

A decorative cap 32 (decorative member) is attached to the end part of the case 36 of the ignition switch 30, to surround the outer circumference of the coil antenna 17. The push button 31 is arranged adjacent to the decorative cap 32. The decorative cap 32 is made from a synthetic resin material. The decorative cap 32 surrounds the outer rim of the push button 31. An edge part of the push button 31 is fitted to a groove 32b formed around the inner surface of the decorative cap 32 in a manner that the push button 31 is movable. The groove 32b guides the push button 31 when the push button 31 is pressed.

The decorative cap 32 has an ornamental surface (outer end surface) 32a, which is exposed. The ornamental surface 32a is furnished with decorative plating 40 having a metallic luster. The decorative plating 40 is formed, for example, by pretreating a surface of a base material for the decorative cap 32 to form a foundation layer on the surface, and then furnishing the foundation layer with chromium plating or black chromium plating. The decorative plating 40 on the decorative cap 32 improves the appearance of the passenger compartment, and enables the push button 31 of the ignition switch 30 to be easily visible to the user in the driver's seat.

Parts of the decorative cap 32 not furnished with the decorative plating 40, i.e., the remaining parts of the decorative cap 32 excluding the ornamental surface 32a furnished with the decorative plating 40, are formed as transmittable areas 42 that can transmit a transponder-driving radio wave output from the coil antenna 17. Without containing metals, such as chromium, which would cause interference with radio waves, the transmittable areas 42 cause almost no interference with radio waves. In the first embodiment, parts of the decorative cap 32 corresponding to the outer side and the inner side of the coil antenna 17 (hatched parts in FIG. 3) have much influence on the strength of a transponder-driving radio wave output from the coil antenna 17. These parts of the decorative cap 32 are included in the transmittable areas 42. This structure ensures formation of a magnetic path for a transponder-driving radio wave output from the coil antenna 17, and ensures formation of a relatively wide communicable area 8 formed in front of the push button 31.

The following describes a series of operations for starting the engine.

When the owner holding the portable device 20 enters into a predetermined area within the vehicle 2, the portable device microcomputer 22 transmits an ID code signal to the vehicle 2 in response to a request signal transmitted from the vehicle controller 10. Upon receipt of the ID code signal transmitted from the portable device 20, the vehicle microcomputer 12 compares an ID code included in the received ID code signal with a preset ID code. Based on the result of the comparison, the vehicle microcomputer 12 determines whether or not to provide the engine starter 18 with a start signal or a stop signal. When the two ID codes are determined as matching, the operation of the ignition switch 30 is validated. When provided with an ON signal by the operation of the ignition switch 30 in this state, the vehicle microcomputer 12 provides the engine starter 18 with a start signal. In response to the start signal, the engine starter 18 starts the stopped engine of the vehicle 2. Alternatively, when provided with an OFF signal by the operation of the ignition switch 30, the vehicle microcomputer 12 provides the engine starter 18 with a stop signal. In response to the stop signal, the engine starter 18 stops the running engine of the vehicle 2.

However, the portable device 20 fails to automatically transmit an ID code signal when the voltage of its battery is too low. If this happens, the owner places the portable device 20 against the push button 31 of the ignition switch 30. Here, the transponder 25 in the portable device 20 is located within the communicable area 8 where a transponder-driving radio wave is being output from the coil antenna 17. The transponder-driving radio wave causes a coil in the transponder 25 to generate electromotive force. Following this, the transponder 25 transmits a transponder signal including a transponder code to the vehicle 2. Upon receipt of the transponder signal, the vehicle microcomputer 12 compares the transponder code included in the received transponder signal with a preset transponder code. Based on the result of the comparison, the vehicle microcomputer 12 determines whether or not to provide the engine starter 18 with a start signal or a stop signal. When the two transponder codes are determined as matching, the operation of the ignition switch 30 is validated. When the owner places the portable device 20 against the push button 31 and presses the push button 31 in this state, the vehicle microcomputer 12 provides the engine starter 18 with a start signal. In response to the start signal, the engine starter 18 drives the stopped engine of the vehicle 2.

The switch device 35 according to the first embodiment has the following advantages.

(1) The decorative cap 32 surrounding the coil antenna 17 has the transmittable areas 42, which include the parts of the decorative cap 32 corresponding to the outer side and the inner side of the coil antenna 17. This structure ensures formation of a magnetic path for a transponder-driving radio wave output from the coil antenna 17, and ensures formation of a relatively wide communicable area 8 formed in front of the push button 31. Thus, the coil antenna 17 fully exhibits its communication function.

(2) The parts of the decorative cap 32 not furnished with the decorative plating 40, i.e., the remaining parts of the decorative cap 32 excluding the ornamental surface 32a are formed as the transmittable areas 42 that can easily transmit a transponder-driving radio wave output from the coil antenna 17. In other words, only a part of the decorative cap 32 that requires ornamentality is furnished with the decorative plating 40 in this structure. This means that the transmittable areas 42 are sufficiently wide. This structure ensures formation of a magnetic path for a transponder-driving radio wave output from the coil antenna 17 without degrading ornamentality of the decorative cap 32.

(3) The coil antenna 17 and the ignition switch 30 are arranged so that their axes C1 and C0 substantially coincide with each other. This structure enables the communicable area 8 to substantially coincide with an area where the ignition switch 30 is operated (i.e., an area where the push button 31 is positioned). By placing the portable device 20 against the push button 31 and pressing the push button 31, the mutual communication between the portable device 20 and the vehicle 2 using a transponder signal, and the operation of the ignition switch 30 are executed substantially at the same time. Therefore, even when the battery of the portable device 20 is drained, the owner can easily start the engine of the vehicle 2.

Second Embodiment

Figure 4:
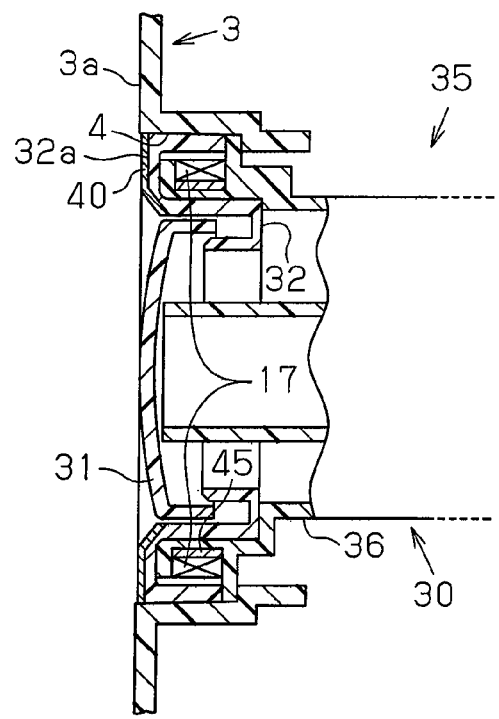
FIG. 4 is a partial cross-sectional view of a switch device according to the second embodiment of the present invention.

The following describes a switch device 35 according to a second embodiment of the present invention with reference to FIG. 4. The switch device 35 according to the second embodiment is based on the switch device 35 according to the first embodiment except that the structure around the decorative cap 32 is changed.

As shown in FIG. 4, an amorphous magnetic body 45, which is a ferromagnetic body, is arranged between the coil antenna 17 and the decorative cap 32. The amorphous magnetic body 45 refers to a magnetic body whose atomic arrangement is not like the ordered atomic arrangement of a crystal. A specific example is an alloy such as amorphous terbium iron cobalt (TbFeCo). In the second embodiment, the amorphous magnetic body 45 is a magnetic thin film with a predetermined thickness, arranged along the inner circumferential surface of the coil antenna 17.

The switch device 35 according to the second embodiment has the following advantages.

The amorphous magnetic body 45, which is arranged along the inner circumferential surface of the coil antenna 17, has high electric conductivity and high magnetic conductivity. The amorphous magnetic body 45 transmits a large portion of a magnetic flux output from the coil antenna 17. Thus, generation of an eddy current in the decorative plating 40 on the decorative cap 32 is prevented. The amorphous magnetic body 45 amplifies a transponder-driving radio wave output from the coil antenna 17. This structure ensures formation of a relative wide communicable area 8 formed in front of the push button 31. Thus, the coil antenna 17 fully exhibits its communication function.

Third Embodiment

Figure 5:
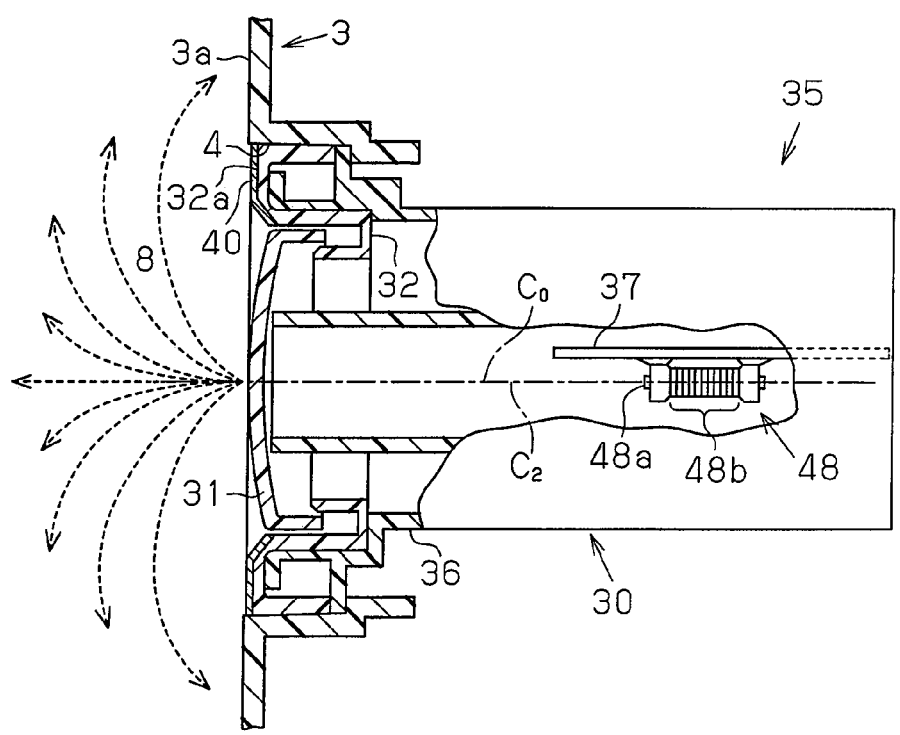
FIG. 5 is a partial cross-sectional view of a switch device according to the third embodiment of the present invention.

The following describes a switch device 35 according to a third embodiment of the present invention with reference to FIG. 5. The switch device 35 according to the third embodiment is based on the switch device 35 according to the first embodiment except that the coil antenna 17 is changed.

As shown in FIG. 5, the switch device 35 according to the third embodiment includes a bar antenna 48 as its communication means for outputting a transponder-driving radio wave, which causes the transponder 25 in the portable device 20 to generate electromotive force. The bar antenna 48 includes a bar core 48a and a coil 48b, which is wound around the core 48a. The core 48a is, for example, a ferromagnetic body, such as an amorphous magnetic body and ferrite. The core 48a is provided to increase the strength of a magnetic field centered on the axis of the coil 48b.

The bar antenna 48 is mounted on a circuit substrate 37 arranged in the case 36 of the ignition switch 30. The bar antenna 48 is spaced from the decorative plating 40 on the ornamental surface 32a of the decorative cap 32. The bar antenna 48 and the ignition switch 30 are arranged so that an axis C2 of the bar antenna 48 and the axis C0 of the ignition switch 30 substantially coincide with each other.

The switch device 35 according to the third embodiment has the following advantages.

(1) The bar antenna 48 is used as communication means for outputting a transponder-driving radio wave. A transponder-driving radio wave output from the bar antenna 48, which is spaced from the decorative plating 40 on the ornamental surface 32a of the decorative cap 32, is not easily blocked by the decorative plating 40. This structure ensures formation of a relatively wide communicable area 8 formed in front of the push button 31. Thus, the bar antenna 48 fully exhibits its communication function.

(2) The bar antenna 48 and the ignition switch 30 are arranged so that their axes C2 and C0 substantially coincide with each other. This structure enables the communicable area 8 to substantially coincide with an area where the ignition switch 30 is operated. By placing the portable device 20 against the push button 31 and pressing the push button 31, the communication between the portable device 20 and the vehicle 2 that uses a transponder signal, and the operation of the ignition switch 30 are executed substantially at the same time. Therefore, even when the battery of the portable device 20 is drained, the owner can easily start the engine of the vehicle 2.

Fourth Embodiment

Figure 6:
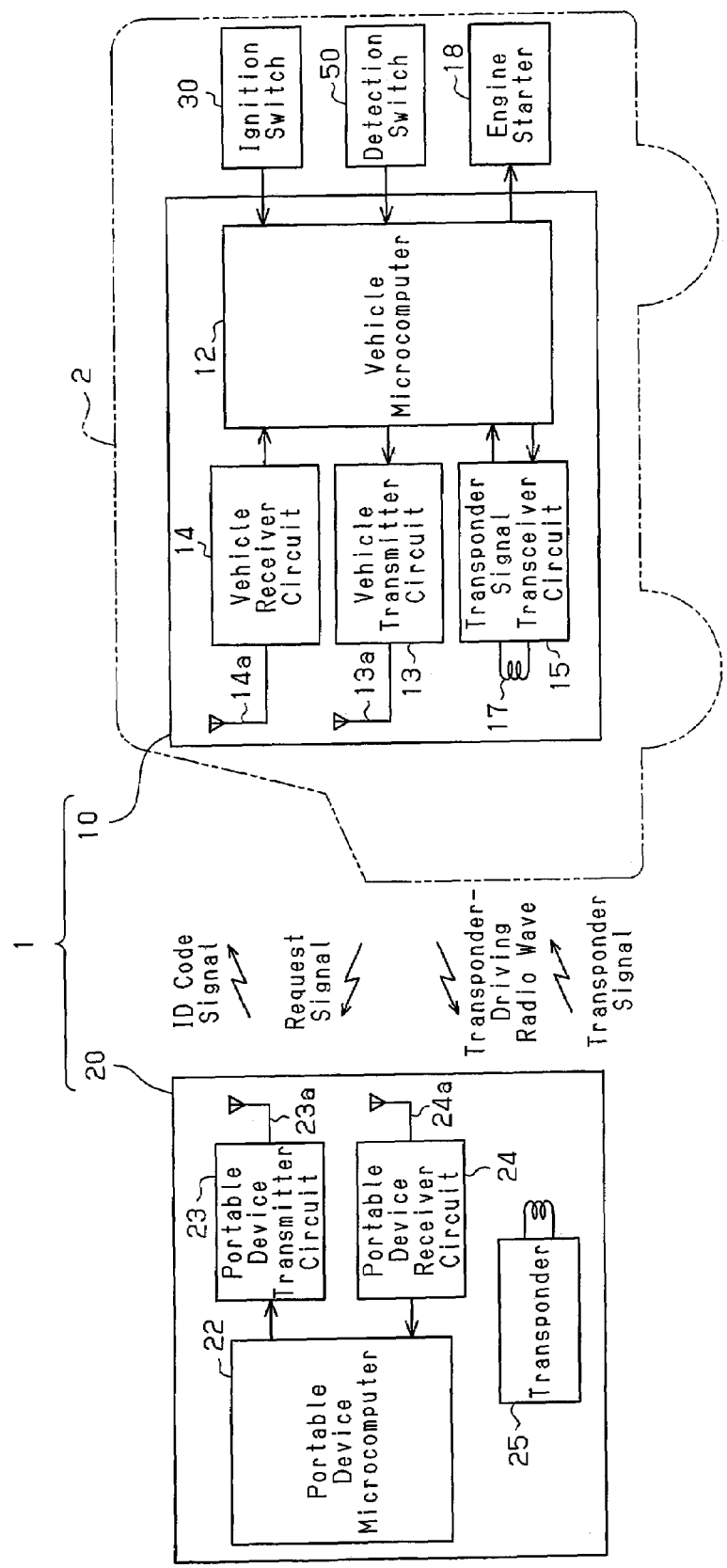
FIG. 6 is a schematic block diagram of an engine start/stop control system according to the fourth embodiment of the present invention.
Figure 7:
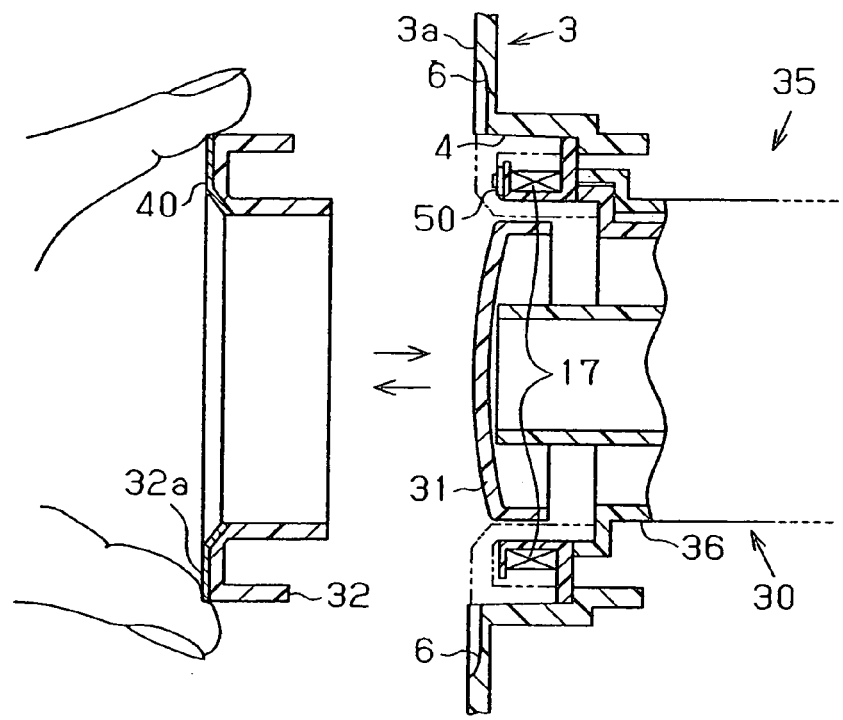
FIG. 7 is a partial cross-sectional view of a switch device, also showing a cross section of a decorative cap, according to the fourth embodiment of the present invention.

The following describes a switch device 35 according to a fourth embodiment of the present invention with reference to FIGS. 6 and 7. The switch device 35 according to the fourth embodiment is based on the switch device 35 according to the first embodiment except that the structure around the decorative cap 32 is changed.

As shown in FIG. 7, a recess 6 is formed along the outer rim of the receptacle 4 in the decorative surface 3a of the instrument panel 3. Unlike the decorative cap 32 according to the first to third embodiments, the decorative cap 32 according to the fourth embodiment does not have the groove 32b for guiding the push button 31. The decorative cap 32 according to the fourth embodiment is removably attached to the end part of the case 36 of the ignition switch 30 by press fitting the decorative cap 32 on the end part of the case 36. The user can remove the decorative cap 32 from the ignition switch 30 by pinching the outer rim of the decorative cap 32 exposed to the recess 6, and pulling the decorative cap 32 away from the ignition switch 30.

A detection switch 50 is arranged at the position of the ignition switch 30 where the decorative cap 32 is to be attached. The detection switch 50 detects whether the decorative cap 32 is attached or removed. The detection switch 50 is, for example, a contact microswitch, or a non-contact proximity switch. The detection switch 50 provides the vehicle microcomputer 12 with a detection signal upon detecting that the decorative cap 32 has been removed.

As shown in FIG. 6, normally, the vehicle microcomputer 12 intermittently transmits a request signal via the transmitter antenna 13a. When the decorative cap 32 is removed, the detection switch 50 provides the vehicle microcomputer 12 with a detection signal. In response to the detection signal, the vehicle microcomputer 12 suspends the transmission of a request signal, and outputs a transponder-driving radio wave via the coil antenna 17. In this way, the vehicle microcomputer 12 switches its output signal from a request signal to a transponder-driving radio wave based on the removal of the decorative cap 32.

The switch device 35 or the engine start/stop control system 1 according to the fourth embodiment has the following advantages.

(1) The decorative cap 32 is removably attached to the end part of the case 36 of the ignition switch 30 by press fitting the decorative cap 32 on the end part of the case 36. The decorative cap 32 is removable to a position where the decorative plating 40 on the ornamental surface 32a of the decorative cap 32 does not block a transponder-driving radio wave output from the coil antenna 17. By moving the decorative cap 32 away from the coil antenna 17 in this way, blocking of a transponder-driving radio wave output from the coil antenna 17 by its decorative plating 40 is prevented. This structure ensures formation of a relatively wide communicable area 8 formed in front of the push button 31. Thus, the coil antenna 17 fully exhibits its communication function.

(2) The vehicle microcomputer 12 switches its output signal from a request signal to a transponder-driving signal based on the removal of the decorative cap 32. This structure enables the user to accurately know the timing at which a transponder-driving radio wave is output from the coil antenna 17. Further, when the output signal from the vehicle controller 10 is switched by the detecting operation of the detection switch 50, the request signal and the transponder-driving radio wave are prevented from interfering with each other.

It should be apparent to those skilled in the art that the present invention may be embodied in many other specific forms without departing from the spirit or scope of the invention. Particularly, it should be understood that the present invention may be embodied in the following forms.

In the first to fourth embodiments, the ornamental surface 32a of the decorative cap 32 is furnished with the decorative plating 40. However, in the second to fourth embodiments, the entire surface of the decorative cap 32 may be furnished with the decorative plating 40. In this structure, the decorative cap 32 does not have the transmittable areas 42 for transmitting a transponder-driving radio signal. This structure eliminates the need for a laborious process of masking the remaining parts of the decorative cap 32 excluding the ornamental surface 32a when plating the decorative cap 32, and reduces the manufacturing cost of the switch device 35.

In the second embodiment, the amorphous magnetic body 45, which is a ferromagnetic body, is arranged between the coil antenna 17 and the decorative cap 32. As another structure, ferrite, which is another ferromagnetic body, may be arranged between the coil antenna 17 and the decorative cap 32.

In the third embodiment, the bar antenna 48 and the ignition switch 30 are arranged so that their axes C2 and C0 substantially coincide with each other. The present invention should not be limited to such a structure. The bar antenna 48 may be arranged at any position within the case 36 of the ignition switch 30 as long as the axis C2 of the bar antenna 48 is not orthogonal to the axis C0 of the ignition switch 30.

In the first to fourth embodiments, the ornamental surface (outer end surface) 32a of the decorative cap 32 is furnished with the decorative plating 40 having a metallic luster. As another structure, for example, a metal coating may be formed on the ornamental surface 32a of the decorative cap 32 by performing electro-deposition coating or sputtering.

In the first to fourth embodiments, the switch device of the present invention is used to start or stop the engine of the vehicle 2. However, the present invention is not limited to such an application. The switch device of the present invention may be used to actuate an in-vehicle electric component, such as a car air-conditioner, or to lock and unlock a door of a housing.

In the first to fourth embodiments, the engine of the vehicle 2 is enabled to be started or stopped when the two transporter codes are determined as matching. As another structure of the engine start/stop control system 1, even if the two transponder codes do not match, the driven engine of the vehicle 2 may be stopped by operating the ignition switch 30.

Figure 8:
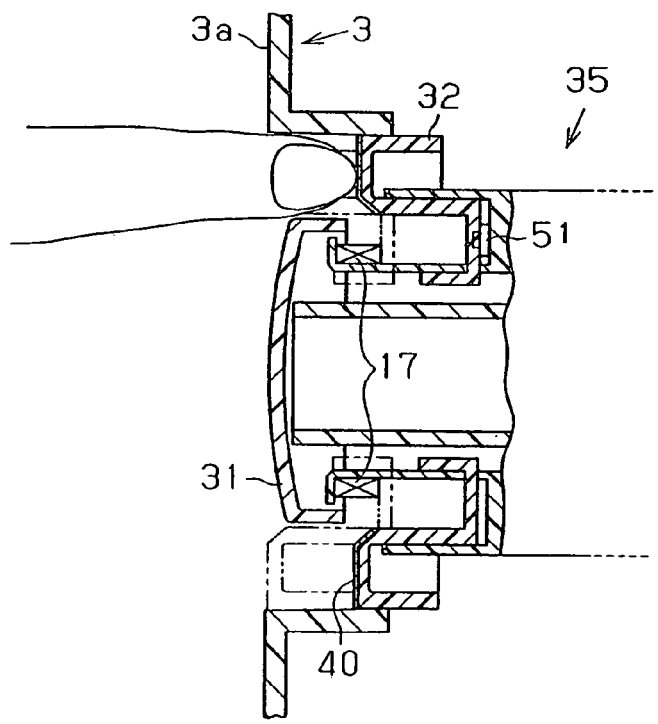
FIG. 8 is a partial cross-sectional view of a switch device of another example.

In the fourth embodiment, the decorative cap 32 is removably attached to the end part of the case 36 of the ignition switch 30 by press fitting the decorative cap 32 on the end part of the case 36. As another structure for the switch device 35, as shown in FIG. 8, the decorative cap 32 may be attached to the end part of the case 36 of the ignition switch 30 in such a manner that the decorative cap 32 can be pressed into the end part of the case 36. In this case, the detection switch 51 may further be arranged at the position where the decorative cap 32 is pressed in. This structure simply requires the user to press the decorative cap 32, to move the decorative cap 32 to such a position where the decorative plating 40 does not block a transponder-driving radio wave output from the coil antenna 17. At the same time, the user can switch the output signal of the vehicle controller 10 from a request signal to a transponder-driving signal. In short, the user is required only to perform a simple operation of pressing the decorative cap 32, to enable the coil antenna 17 to exhibit its communication function, and also to accurately know the timing at which a transponder-driving radio wave is output.

Figure 9A:
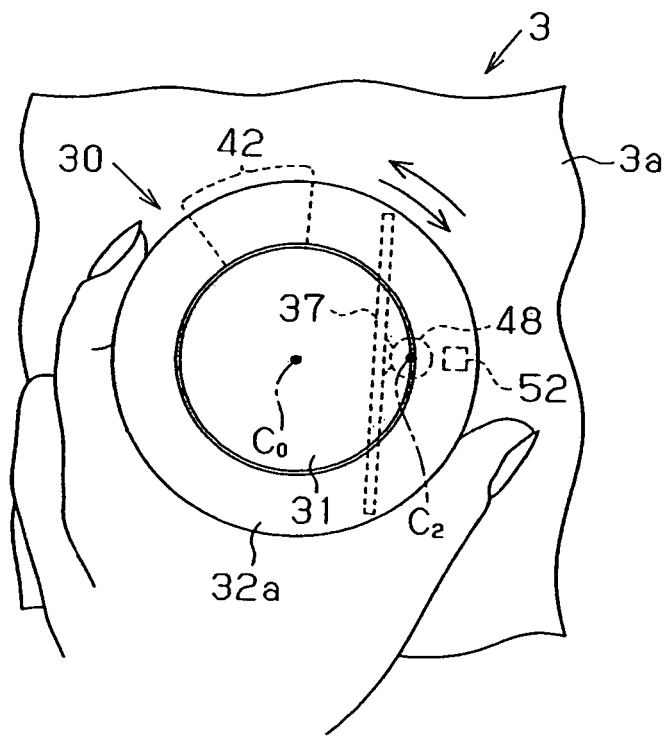
FIGS. 9A and 9B are diagrams for explaining a turning operation of a decorative cap in the switch device of a further example.
Figure 9B:
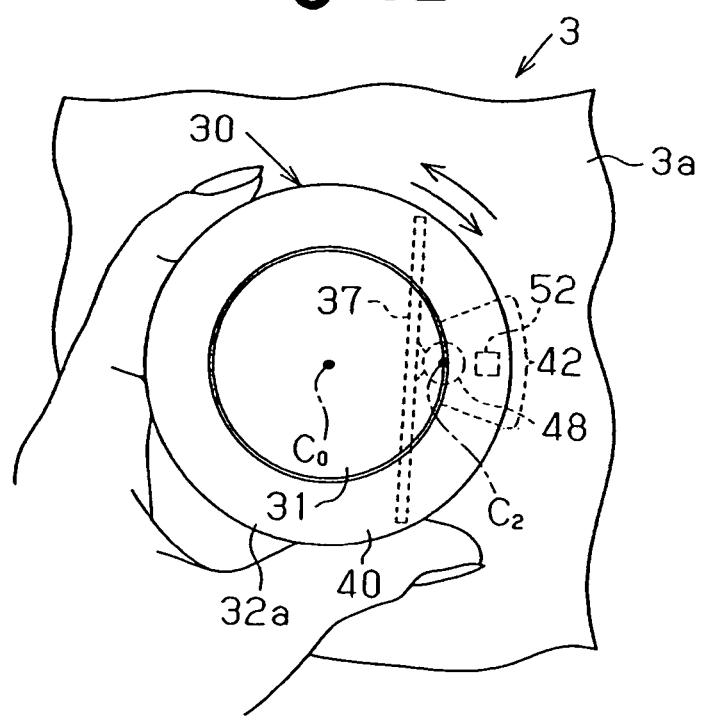

As shown in FIGS. 9A and 9B, the decorative cap 32 may be attached to the end part of the case 36 of the ignition switch 30 in a manner that it is rotatable. In this structure, part of the decorative cap 32, which extends from its outer end surface in the direction of the axis of the decorative cap 32, is formed as the transmittable area 42. The remaining part of the decorative cap 32 excluding the transmittable area 42 is furnished with the decorative plating 40. In the switch device shown in FIGS. 9A and 9B, for example, the bar antenna 48 is arranged in the vicinity of the side wall of the case 36 of the ignition switch 30, i.e., at the position deviating from the axis C0 of the ignition switch 30. In FIG. 9A, the transmittable area 42 is not at a position corresponding to the bar antenna 48. The user may move the transmittable area 42 to a position corresponding to the bar antenna 48 by turning the decorative cap 32 from the position shown in FIG. 9A to the position shown in FIG. 9B. In this way, the transmittable area 42 of the decorative cap 32 is moved to a position where the decorative plating 40 does not easily block a transponder-driving radio wave output from the bar antenna 48, i.e., to a position where the decorative plating 40 does not cause interference with radio waves. This structure ensures formation of a magnetic path for a transponder-driving radio wave output from the bar antenna 48 by turning the decorative cap 32. The switch device 35 may further include a detection switch 52, which is switched on and provides the vehicle controller 10 with a detection signal when the decorative cap 32 is turned to a predetermined position. In this structure, the vehicle controller 10 may switch its output signal from a request signal to a transponder-driving signal in response to the detection signal. The user is required only to perform the simple operation of turning the decorative cap 32, to enable the bar antenna 48 to exhibit its communication function, and also to accurately know the timing at which a transponder-driving radio wave is output.

The present examples and embodiments are to be considered as illustrative and not restrictive, and the invention is not to be limited to the details given herein, but may be modified within the scope and equivalence of the appended claims.

What is claimed is:

1. A switch device for use by an operator and connected to an actuator, for enabling the actuator to be driven when an ID code transmitted from a transponder of a portable device matches a predetermined ID code of a vehicle controller, the switch device comprising:
    an operation switch operated by the operator, driving the actuator;
    a decorative member arranged to surround the operation switch, the decorative member including an exposed portion having an ornamental surface that is furnished with decorative plating; and
    a communication means arranged adjacent to the decorative member, transmitting a transponder-driving radio wave that causes the transponder to generate electromotive force used to transmit the ID code, wherein the decorative member includes a transmittable area for transmitting the transponder-driving radio wave, the transmittable area being formed in a part of the decorative member excluding the exposed portion.

2. The switch device according to claim 1, wherein the communication means includes a coil antenna.

3. The switch device according to claim 2, wherein the coil antenna and the operation switch are arranged so that an axis of the coil antenna and an axis of the operation switch substantially coincide with each other.

4. The switch device according to claim 1, wherein the decorative member is attached to the operation switch in a rotatable manner so that the transmittable area is movable to a position corresponding to the communication means.

5. The switch device according to claim 4, further comprising:
a detection switch, detecting that the transmittable area has moved to the position corresponding to the communication means, wherein the communication means transmits the transponder-driving radio wave based on the movement of the transmittable area detected by the detection switch.

6. A switch device for use by an operator and connected to an actuator, for enabling the actuator to be driven when an ID code transmitted from a transponder of a portable device matches a predetermined ID code of a vehicle controller, the switch device comprising:
an operation switch operated by the operator, driving the actuator, the operation switch including an operation button and a case;
a coil antenna wound around the case, transmitting a transponder-driving radio wave that causes the transponder to generate electromotive force used to transmit the ID code; and
a decorative member attached to the case to surround the operation button and the coil antenna, the decorative member including an exposed portion having an ornamental surface that is furnished with decorative plating, wherein the decorative member includes a transmittable area for transmitting the transponder-driving radio wave, the transmittable area being formed in a part of the decorative member that excludes the exposed portion and that corresponds to an outer side and an inner side of the coil antenna.

7. A switch device for use by an operator and connected to an actuator, for enabling the actuator to be driven when an ID code transmitted from a transponder of a portable device matches a predetermined ID code of a vehicle controller, the switch device comprising:
an operation switch operated by the operator, driving the actuator;
a decorative member arranged to surround the operation switch, the decorative member including an exposed portion having an ornamental surface that is furnished with decorative plating;
a communication means arranged adjacent to the decorative member, transmitting a transponder-driving radio wave that causes the transponder to generate electromotive force used to transmit the ID code; and
a ferromagnetic body, arranged between the communication means and the decorative member, amplifying the transponder-driving radio wave and preventing the generation of an eddy current in said decorative member.

8. The switch device according to claim 7, wherein the communication means has an inner circumferential surface, and the ferromagnetic body is arranged along the inner circumferential surface of the communication means.

9. The switch device according to claim 7, wherein the ferromagnetic body is an amorphous magnetic body or a ferrite.

10. The switch device according to claim 7, wherein the communication means includes a coil antenna.

11. The switch device according to claim 10, wherein the coil antenna and the operation switch are arranged so that an axis of the coil antenna and an axis of the operation switch substantially coincide with each other.

12. A switch device for use by an operator and connected to an actuator, for enabling the actuator to be driven when an ID code transmitted from a transponder of a portable device matches a predetermined ID code of a vehicle controller, the switch device comprising:
an operation switch operated by the operator, driving the actuator;
a decorative member arranged to surround the operation switch, the decorative member including an exposed portion having an ornamental surface that is furnished with decorative plating; and
a communication means spaced from the decorative member, transmitting a transponder-driving radio wave that causes the transponder to generate electromotive force used to transmit the ID code, the communication means including a ferromagnetic core, for amplifying the transponder-driving radio wave and preventing the generation of an eddy current in said decorative member, and a coil wound around the core.

13. The switch device according to claim 12, further comprising:
a case to which the decorative member is attached and in which the communication means is arranged.

14. The switch device according to claim 12, wherein the communication means and the operation switch are arranged so that an axis of the communication means and an axis of the operation switch substantially coincide with each other.

15. The switch device according to claim 12, wherein the core is made of an amorphous magnetic body or ferrite.

16. A switch device for use by an operator and connected to an actuator, for enabling the actuator to be driven when an ID code transmitted from a transponder of a portable device matches a predetermined ID code of a vehicle controller, the switch device comprising:
an operation switch operated by the operator, driving the actuator;
a decorative member arranged to surround the operation switch; and
a communication means arranged adjacent to the decorative member, transmitting a transponder-driving radio wave that causes the transponder to generate electromotive force used to transmit the ID code, wherein the decorative member is separable from the communication means to ensure formation of a magnetic path for the transponder-driving radio wave near the operation switch.

17. The switch device according to claim 16, wherein the decorative member is removably attached to the operation switch.

18. The switch device according to claim 16, wherein the decorative member is pressible into the operation switch.

19. The switch device according to claim 16, further comprising:
a detection switch, detecting that the decorative member is separated from the communication means at a position ensuring the formation of the magnetic path for the transponder-driving radio wave near the operation switch, wherein the communication means transmits the transponder-driving radio wave based on the separation of the decorative member detected by the detection switch.

20. The switch device according to claim 16, wherein the communication means includes a coil antenna.

21. The switch device according to claim 20, wherein the coil antenna and the operation switch are arranged so that an axis of the coil antenna and an axis of the operation switch substantially coincide with each other.

22. A switch device for use by an operator and connected to an actuator, for enabling the actuator to be driven when an ID code transmitted from a transponder of a portable device matches a predetermined ID code of a vehicle controller, the switch device comprising:

an operation switch operated by the operator, driving the actuator, the operation switch including an operation button and a case;

a coil antenna wound around the case, transmitting a transponder-driving radio wave that causes the transponder to generate electromotive force used to transmit the ID code;

a decorative member removably attached to the case to surround the operation button and the coil antenna; and a detection switch, detecting that the decorative member has been removed from the case, wherein the coil antenna transmits the transponder-driving radio wave based on the removal of the decorative member detected by the detection switch.

* * * * *